US007405893B2

(12) United States Patent
Bi et al.

(10) Patent No.: US 7,405,893 B2
(45) Date of Patent: Jul. 29, 2008

(54) DATA STORAGE MEDIUM WITH OPTIMIZED SERVO FORMAT

(75) Inventors: Qiang Bi, Singapore (SG); KianKeong Ooi, Singapore (SG); TaiVie Chiang, Singapore (SG); WingKong Chiang, Singapore (SG); Edmun ChianSong Seng, Singapore (SG); Jimmy Pang, Singapore (SG); BengWee Quak, Singapore (SG); UttHeng Kan, Singapore (SG); Xiong Liu, Singapore (SG); Ricardo SoonLian Lim, Singapore (SG); Patrick TaiHeng Wong, Singapore (SG); MingZhong Ding, Singapore (SG); WeiMing Yeow, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 304 days.

(21) Appl. No.: 11/231,960

(22) Filed: Sep. 21, 2005

(65) Prior Publication Data

US 2007/0064325 A1 Mar. 22, 2007

(51) Int. Cl.
*G11B 5/09* (2006.01)
*G11B 5/596* (2006.01)

(52) U.S. Cl. ..................................... 360/48; 360/77.08

(58) Field of Classification Search ....................... None
See application file for complete search history.

(56) References Cited

U.S. PATENT DOCUMENTS 4,589,037 A 5/1986 Jen et al.
4,894,734 A 1/1990 Fischler et al.
5,206,847 A 4/1993 Kanda
5,241,433 A * 8/1993 Anderson et al. ........ 360/77.04
5,253,131 A 10/1993 Chevalier
5,440,474 A 8/1995 Hetzler
5,453,887 A 9/1995 Negishi et al.
5,526,211 A 6/1996 Hetzler
5,535,067 A 7/1996 Rooke
5,615,065 A 3/1997 Cheung
5,654,948 A 8/1997 Tobita
5,784,219 A 7/1998 Genheimer
5,818,659 A 10/1998 Cheung et al.
5,825,579 A 10/1998 Cheung et al.
6,034,835 A 3/2000 Serrano
6,049,438 A 4/2000 Serrano et al.
6,078,445 A 6/2000 Serrano et al.
6,118,604 A 9/2000 Duffy
6,178,056 B1 * 1/2001 Cloke et al. ................... 360/46
6,212,027 B1 * 4/2001 Lee et al. ................. 360/78.14
6,366,423 B1 4/2002 Ahn
6,674,604 B1 * 1/2004 Teng et al. ............... 360/78.04
6,785,085 B2 8/2004 Guzik et al.
6,873,483 B2 3/2005 Hetzler et al.
2003/0043710 A1 3/2003 Shelton et al.
2003/0142435 A1 * 7/2003 Tomiyama et al. ............ 360/75
2003/0197968 A1 10/2003 Sacks et al.

* cited by examiner

*Primary Examiner*—Joseph Feild
*Assistant Examiner*—Daniell L Negrón
(74) *Attorney, Agent, or Firm*—McCarthy Law Group

(57) ABSTRACT

A data storage medium and data storage system with improved efficiency of formatting are provided. One illustrative embodiment of the present invention pertains to a data storage medium. The data storage medium includes a first zone having servo information written with a first frequency, a second zone having servo information written with a second frequency, and a guard band disposed between the first zone and the second zone. The use of different frequencies in different zones contributes to optimizing the properties of the data storage medium, and the guard band contributes to optimizing the usage of the different zones.

20 Claims, 7 Drawing Sheets

DATA STORAGE MEDIUM WITH OPTIMIZED SERVO FORMAT

FIELD OF THE INVENTION

The present invention relates generally to data storage media, and in particular to a data storage medium with optimized servo format.

BACKGROUND OF THE INVENTION

Data storage devices have tended to be made ever smaller, yet with ever greater storage capacity, as technology has advanced. Many applications require "micro" data storage devices that are one inch or smaller in diameter, and a fraction of an ounce in weight, for example. Applications for which micro data storage devices are well suited include hand-held or otherwise easily portable devices, such as digital music players, PDAs, digital still cameras and video cameras, and external computer memory, for example. Adapting data storage technology with optimum performance in current applications poses considerable technical challenges.

Embodiments of the present invention provide unforeseen advantages over conventional data storage systems, and provide superior performance characteristics.

SUMMARY OF THE INVENTION

A data storage medium and data storage system with improved efficiency of formatting are provided. One embodiment of the present invention pertains to a data storage medium. The data storage medium includes a first zone having servo information written with a first frequency, a second zone having servo information written with a second frequency, and a guard band disposed between the first zone and the second zone.

Another embodiment pertains to a data storage system having a deck, a media surface disposed on the deck, and a read/write head suspended from the deck. The read/write head is controllably positionable proximate to the media surface. The media surface includes radial servo fields, annular zones, and guard bands. Each zone has a frequency with which the servo fields are written in that zone, that is different from a frequency of another zone. The guard bands are between at least one pair of the zones.

Another embodiment pertains to a data storage system that includes a read-write head and a data storage medium. The data storage medium includes servo information having two or more frequencies, with a higher frequency toward an outer diameter of the data storage medium than toward an inner diameter of the data storage medium. The data storage medium also includes a means for the read/write head to sync to the servo information at each of the frequencies on the data storage medium.

Other features and benefits that characterize various embodiments will be apparent from the following detailed description, the associated drawings, and the other disclosure herein.

DETAILED DESCRIPTION OF ILLUSTRATIVE EMBODIMENTS

Figure 1:
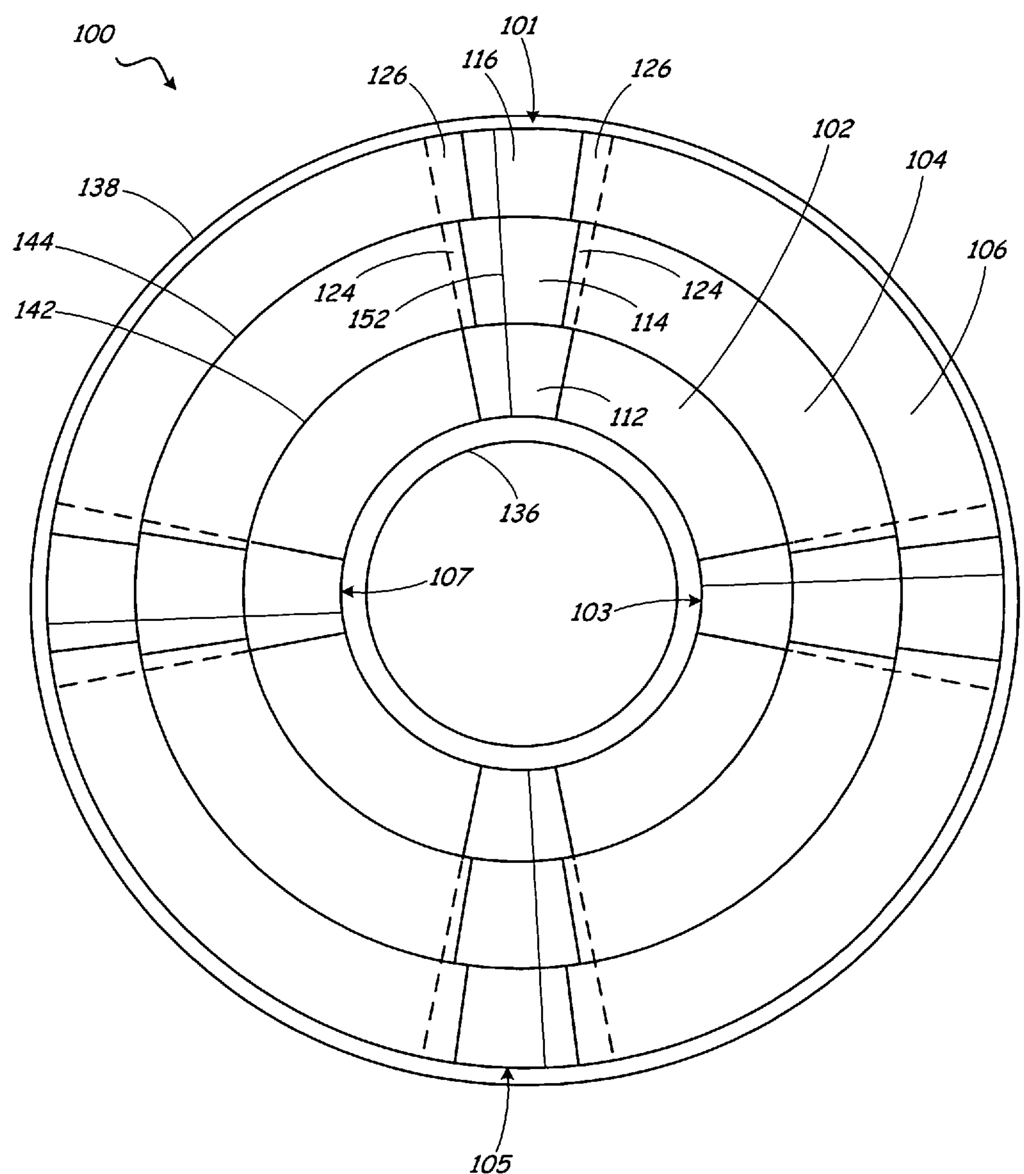
FIG. 1 is a plan view of a data storage medium with optimized servo format, according to one illustrative embodiment.

FIG. 1 is a plan view of a data storage medium 100, with optimized servo format, according to one illustrative embodiment. Medium 100 includes many inventive elements that provide substantial advantages in performance, as detailed with respect to FIG. 1 and the remaining figures. For example, medium 100 provides advantageous performance by various inventive elements for optimizing its servo fields, such as servo bits written at higher frequency corresponding to greater radius, which provides reduced servo overhead and an increased proportion of data storage medium 100 devoted to storing data, for example. The servo fields occupy area on the medium 100 that is thereby removed from availability for data, although the servo fields are advantageous in providing an associated read/write head with the information it needs to navigate the data tracks written onto medium 100. Some of the inventive elements of embodiments disclosed herein maximize the servo performance of the servo fields while minimizing the area of medium 100 that the servo fields take up. Various inventive elements are described in detail as follows below.

In particular, medium 100 includes different annular zones, such as the three zones 102, 104, and 106 disposed generally concentrically on medium 100, in the particular embodiment of FIG. 1. Medium 100 has an inner boundary or inner diameter 136 and an outer boundary or outer diameter 138. Zone 102 is adjacent inner boundary 136 and may be considered the inner zone, while zone 106 is adjacent outer boundary 138 and may be considered the outer zone, in this illustrative embodiment. With respect to the intermediate zone 104, therefore, the inner zone 102 is a next inward zone from zone 104, and the outer zone 106 is a next outward zone from zone 104. A first annular guard band 142 is disposed between inner zone 102 and zone 104 and thereby nested between inner zone 102 and zone 104, and a second annular guard band 144 is disposed between zone 104 and outer zone 106 and thereby nested between zone 104 and outer zone 106.

Zones 102, 104 & 106 are transected by a number of servo sectors, each composed of a series of servo fields, as illustratively and exaggeratedly depicted generally along illustrative servo fields 112, 114, 116 of servo sector 101, and along other, similar servo sectors 103, 105, 107 disposed around media surface 100. Each of servo fields 112, 114, 116 radially spans one of zones 102, 104 & 106, with servo field 112 spanning zone 102, servo field 114 spanning zone 104, and servo field 116 spanning zone 106, in this illustrative embodiment. By radially spanning the zones, each of servo fields 112, 114, 116 extends from a radially inward position in its respective zone, to a radially outward position in its respective zone. The actual servo sectors would be much smaller and narrower, and more plentiful, than in the depiction of FIG. 1, which has been exaggerated for clarity. Address marks extend radially from the inner diameter to the outer diameter within the servo zones, such as illustrative address mark 152 within servo sector 101. Illustrative servo fields 112, 114, 116 include servo field bits written on medium 100. The gaps 124, 126 adjacent servo fields 114, 116 are described below. The servo field bits may be written onto medium 100 during manufacture, with a specialized external write head, in one illustrative embodiment. The servo fields may also be written in situ, in another illustrative embodiment.

Writing the servo bits to medium 100 involves rotating medium 100 while the write head writes one bit after another, in a selected frequency with which it writes new bits, with the inverse of the frequency being the period of time spent in writing each bit, in this illustrative embodiment. The servo frequency is typically less than the data read/write frequency, in this illustrative embodiment. The servo bits thereby written onto medium 100 each occupy a given arc length determined by the period expended writing the bit, times the rotation rate of the medium during the write, times the radial displacement of the position where the bit is written onto the medium from the center of rotation of the medium. Therefore, if the same frequency is used for writing bits at different displacements from the center of rotation, a bit written at a greater radial displacement will also have a greater arc length than a bit written at a lesser radial displacement, in this illustrative embodiment.

In conventional devices, the frequency is set so that, during normal operation, a read/write head is able to read the bits with the shortest arc length, i.e. those at the smallest radial displacement from the center of rotation, adjacent the inner diameter of a medium, with a specified level of assured read performance. This means bits at greater radial displacement from the center of rotation occupy a greater arc length than is needed to be read by the read/write head with the same level of assurance as for the bits adjacent the inner diameter. The extra arc length of all these bits away from the inner diameter reduces the area that can be reclaimed from servo overhead and devoted instead to useful data storage, and so can be considered wasted space, if a way can be found to reclaim this space without degrading other performance aspects. By reclaiming back the servo overhead area, the reclaimed real estate (1) can be used to store more data and/or (2) enables a reduced data frequency which benefits a lower bit error rate and a better signal to noise ratio (SNR) in reading data. In one illustrative embodiment, the data SNR was improved by 0.4 dB.

In one illustrative embodiment, this extra space is reclaimed for data storage by dividing the medium into separate zones, and writing the servo field bits in a higher frequency for zones away from the inner diameter, such that the farther a zone is from the inner diameter, the higher the frequency is with which the servo field bits are written in that zone. In the specific illustrative embodiment of FIG. 1, medium 100 includes the three zones 102, 104, 106, and the servo field bits are written in a first frequency in zone 102, in a second frequency in zone 106 that is higher than the frequency of zone 102, and a third frequency in zone 104 that is higher than the frequency in zone 102 and lower than the frequency in zone 106. Zones 102, 104, and 106 may thereby be referred to as differential frequency zones. Because the servo field bits in zones 104 and 106 are written at progressively higher frequencies, they also occupy correspondingly shorter arc lengths than they would have at the single frequency, thereby reducing servo overhead and leaving a greater proportion of the medium available for storing data. This is demonstrated with the gaps 124 and 126 adjacent to servo fields 114 and 116 respectively. The dotted lines show what the boundaries of these two servo fields would be if the entire medium 100 was written with the frequency with which servo field 112 was written. Gaps 124 and 126 are therefore areas that would have gone to servo field use but instead are freed up for data storage use, thanks to the use of multiple frequencies in writing the servo bits of medium 100.

As can be seen in FIG. 1, each of the servo fields 112, 114, 116 takes the form of a semi-annular section. Rather than the single semi-annular section for a given servo field that would prevail without dividing the medium into different frequency zones, each servo sector includes a radial row of semi-annular sections constituting separate servo fields, such that the inward semi-annular section 112 has the largest angular spread of servo fields in its servo sector, and each of the other servo fields has an angular spread that is lesser than that of the inwardly adjacent semi-annular section, in one illustrative embodiment. That is, servo field 112 is the inwardly adjacent servo field to servo field 114, and servo field 114 is inwardly adjacent to servo field 116. Correspondingly, servo field 114 has a lesser angular spread than servo field 112, and servo field 116 has a lesser angular spread than servo field 114. The servo field bits within each of the servo fields 112, 114, 116 each have an angular spread that is proportional to the angular spread of the servo field within which it is disposed, and an arc length that is the angular spread times the radial displacement from the center of medium 100 at a given position of each respective servo bit, in one illustrative embodiment. Therefore, the servo bits within one of the servo fields have arc lengths that steadily increase proportionately with increasing radius; but going from one servo field to an outwardly adjacent servo field within a servo sector, the arc lengths of the lowest-radius servo bits in the outwardly adjacent servo fields are significantly lesser than the arc lengths of the highest-radius servo bits in the inwardly adjacent servo field. Once again, the arc lengths of these servo bits steadily increases with increasing radius. Thus, the servo field bits in the inwardly adjacent zone have a first range of arc lengths, and the servo field bits in the outwardly adjacent zone have a second range of arc lengths that substantially overlaps the first range of arc lengths. This provides for reduced area devoted to servo function, or servo overhead, for the intermediate and outer zones 104 and 106 relative to inner zone 102, and relative to what would be required for the entire medium in the absence of differential frequency zoning, for this illustrative embodiment.

The following table presents an illustrative example of the servo overhead reduction, comparing a conventional system with a constant servo frequency of 14 MHz and a constant servo overhead of 8.13%, with an example of an illustrative embodiment, using the same specifications as the conventional system for its inner zone:

| | Conventional System | | System According to Illustrative Embodiment | | |
|---|---|---|---|---|---|
| Zone | Servo Frequency (MHz) | Servo Overhead (%) | Servo Frequency (MHz) | Servo Overhead (%) | Reduction (%) |
| Inner | 14 | 8.13 | 14 | 8.13 | 0 |
| Intermediate | 14 | 8.13 | 17.5 | 6.52 | 1.61 |
| Outer | 14 | 8.13 | 21 | 5.42 | 2.71 |

In the illustrative embodiment, the intermediate zone, corresponding to zone 104, is written with a frequency of 17.5

MHz, which reduces the size of the servo fields enough to reduce servo overhead to 6.52% in the intermediate zone, so that 1.61% of the medium surface that would have been devoted to servo bits is instead available for data storage; and the outer zone, corresponding to zone 106, is written with a frequency of 21 MHz, which reduces the size of the servo fields enough to reduce servo overhead to 5.42% in the outer zone, so that 2.71% of the outer surface that would have been devoted to servo bits is instead available for data storage. Because the outer zone contains far more area than the inner zone and more area than the intermediate zone, the overall servo overhead reduction is greater than the figure for the intermediate zone and not much less than that for the outer zone, in this illustrative embodiment. Other embodiments use only two zones, or four or more zones, each with its own servo frequency.

In some illustrative embodiments, as the diameter of the medium becomes smaller, the proportion of area reclaimed from servo overhead for data storage becomes greater. Therefore, this inventive system using differential frequency zones is especially advantageous for very small data storage media and data storage devices, according to these illustrative embodiments. For example, one illustrative embodiment corresponding to the depiction of medium 100 measures approximately one inch across. Other illustrative embodiments corresponding to the depiction of medium 100 occupy a range of diameters less than one inch. Still other illustrative embodiments have larger diameters such as 2.5 inches or 3.5 inches, or other values, while corresponding to scale with medium 100 as depicted in FIG. 1. Different embodiments otherwise analogous to medium 100 also include a wide variety of different numbers of zones, and a wide variety of different numbers of servo sectors.

One significant issue concomitant with the differential frequency zones, such as zones 102, 104, 106 in the illustrative embodiment of FIG. 1, concerns their characteristics near the boundaries between each adjacent set of zones 102, 104, 106. This issue is inventively and advantageously addressed by first guard band 142 and second guard band 144, disposed between zones 102 and 104, and between zones 104 and 106, respectively. The details of such guard bands, in a variety of inventive and advantageous embodiments, are described below, with reference to several of the figures.

Figure 2:
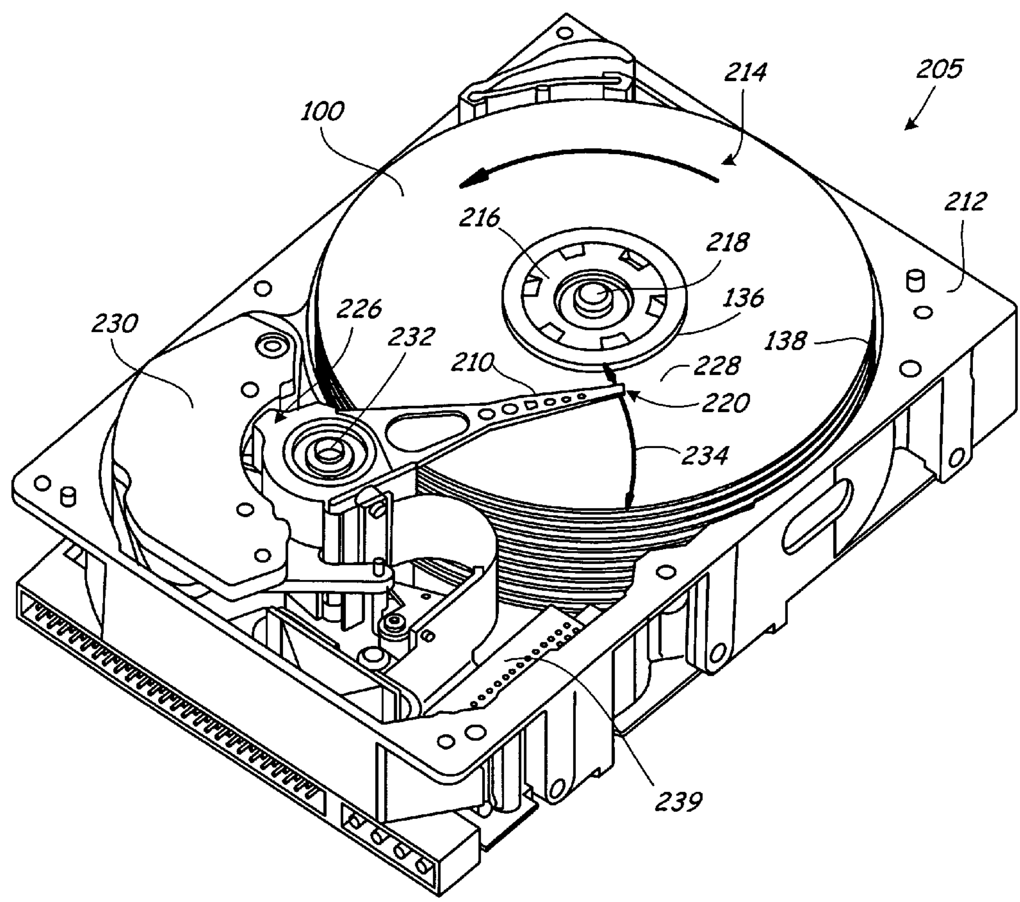
FIG. 2 is a perspective view of a data storage system that may incorporate a data storage medium with optimized servo format, according to an illustrative embodiment.

FIG. 2 depicts data storage system 205 which illustratively embodies the present invention, and shows an illustrative context within which the illustrative embodiment of medium 100 may be used. FIG. 2 depicts a perspective view of a data storage system 205, illustratively embodied as a disc drive in this embodiment, which includes disc 100 with optimized servo format, according to an illustrative embodiment.

Disc drive 205 is one example from a variety of data storage systems to which various embodiments are applicable. Disc drive 205 includes a housing with a deck 212 and a top cover (not shown). Disc drive 205 also includes a disc pack 214 comprising disc 100 and several other, similar discs. Disc pack 214 is rotatably mounted on deck 212 on a spindle motor (not shown) by a disc clamp 216. Disc pack 214 includes a plurality of individual discs which are mounted for co-rotation about central axis 218. Each disc surface has an associated slider 220 which is mounted to disc drive 205 and carries a data interface head (not shown), with read and/or write function, on slider 220 for communication with the respective disc surface 228, in this illustrative embodiment.

In FIG. 2, representative slider 220 is supported by suspension 210 which is rotatably mounted on deck 212. More particularly, suspension 210 is rotatably mounted on actuator 226, included on deck 212, and is thereby disposed on deck 212 in a controllably moveable way. Suspension 210 supplies a pre-load force to slider 220 which is substantially normal to opposing disc surface 228. The pre-load force counteracts an aerodynamic lifting force developed between slider 220 and disc surface 228 during the rotation of disc pack 214. Each disc surface is likewise interfaced by a similarly disposed slider (not shown). Actuator 226 is a rotary moving coil actuator and includes a voice coil motor, shown generally at 230, in this illustrative embodiment. Voice coil motor 230 rotates actuator 226 about pivot shaft 232 to position slider 220 over an intended data track (not shown) along a slider range 234 between a disc inner diameter 136 and a disc outer diameter 138. Voice coil motor 230 operates under control of internal circuitry 239. Other elements may occur in alternative embodiments, such as an actuator that positions the read/write head through linear extension and retraction, for example.

Slider 220 has a read/write head (not separately shown) disposed thereon, configured thereby to be controllably positioned proximate to the disc surface 228. The read/write head on head-bearing slider 220 is capable of reading data from and writing data to disc surface 228, in this illustrative embodiment. The read/write heads may be of any type known in the art, including magnetic, magnetoresistive, giant magnetoresistive (GMR), optical, and so forth, in various embodiments. In different embodiments, a wide variety of numbers of discs, with a corresponding number of read/write heads and head-bearing sliders, may occur.

Disc 100 of disc drive 205 includes radial servo fields disposed at generally regular intervals around the media surface, as shown in FIG. 1. Likewise, the surface of disc 100 is divided into two or more annular zones (not separately shown in FIG. 2), such as the three zones 102, 104, 106 of FIG. 1, each with a respective frequency with which the read/write head is specified to operate within that zone. Each of the servo fields extends across one of the zones. The surface of disc 100 comprises guard bands 142, 144 between each pair of adjacent zones, such that the guard bands are configured to optimize the capability of the read/write head to remain operating at the respective frequency specified for each zone while the read/write head is in that zone, and to transition to the respective frequency of a new zone from among the zones when the read/write head moves to the new zone. With the servo fields written at different frequencies in different zones, the read/write heads also use different read frequencies for reading the servo fields in each of the zones.

One significant performance issue pertaining to the differential frequency zones is how to transition the read/write head between zones with different servo frequencies, or how to synchronize the servo channel to the servo bursts on different zones with different burst frequencies, particularly when crossing from one of the zones to another.

Figure 3:
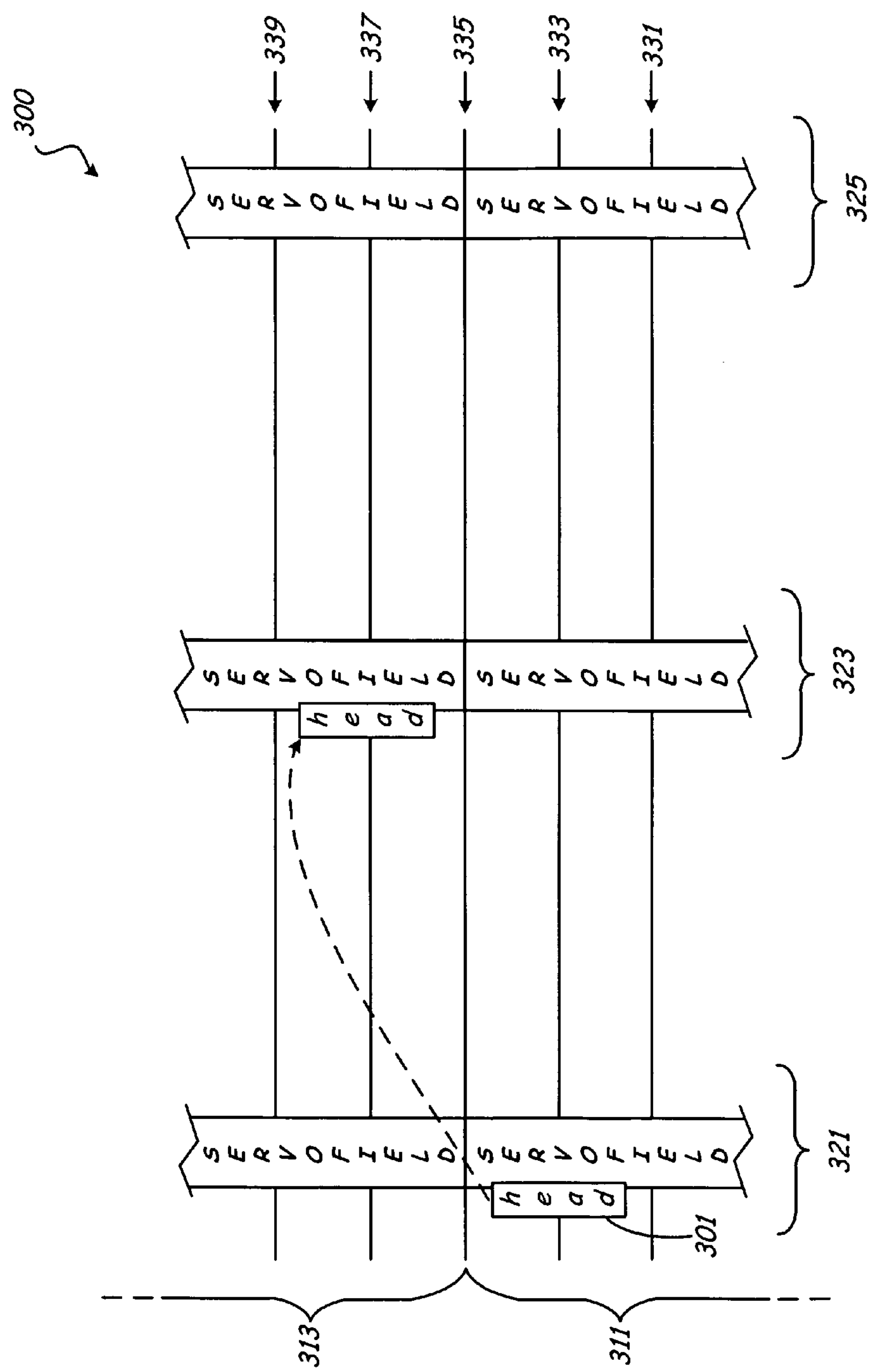
FIG. 3 is a close-up schematic of a section of a data storage medium with optimized servo format, according to an illustrative embodiment.

FIG. 3 depicts a relatively simple embodiment of a zone boundary, with only a minimal, single track guard band 335 separating the two zones 311, 313 which have different frequencies. The depiction in FIG. 3 represents a microscopic view of a portion of a media surface 300. Tracks 331, 333, 335, 337 and 339 are portions of concentric tracks that circumscribe media surface 300. The depicted sections of tracks 331, 333, 335, 337 and 339 are actually circle sections, but seen at such close range relative to their diameters that they are difficult to distinguish from straight lines. Zone 311 is inward of zone 313, toward the center of media surface 300; zone 313 is outward of zone 311, toward the perimeter of media surface 300. Tracks 331, 333, 337 and 339 are data tracks, available for writing data to and reading data from; track 335, because it lies directly on the boundary between zones 311 and 313, is useless for writing data to. The features depicted in FIG. 3 are illustrative of features disposed around the wider media surface 300.

Servo sectors (which can also be called servo wedges) 321, 323, and 325 lie along radial lines on media surface 300, across the data tracks. Servo sectors 321, 323, and 325 include servo fields. The portions of the tracks within the servo fields contain servo information, such as position and synchronization information, which can be used by the read/write head 301 to control its position relative to representative tracks 331, 333, 335, 337 and 339, and to sync to the servo fields at the frequency with which they are written. The servo fields in zone 313 are written with a higher frequency than the frequency with which the servo fields in zone 311 are written, in this illustrative embodiment.

Read/write head 301 is depicted seeking from track 333 at servo field strip 321 to track 337 at servo field strip 323. However, in this embodiment, it may be difficult for head 301 to perform this seek successfully, and to sync to the servo bursts in zone 313 with the higher frequency of zone 313. When the head 301 is near the zone boundary at track 335, it may become likely to experience a Missing Address Mark error, or a loss of synchronization with the new zone servo information before the re-initialization of the servo channel is complete. This would generally require a recovery algorithm to handle, and involves loss of control and predictability. Additionally, in case of a shock to the system while head 301 is near the boundary track 335, this would also increase the risk of a loss of synchronization with the servo information.

Figure 4:
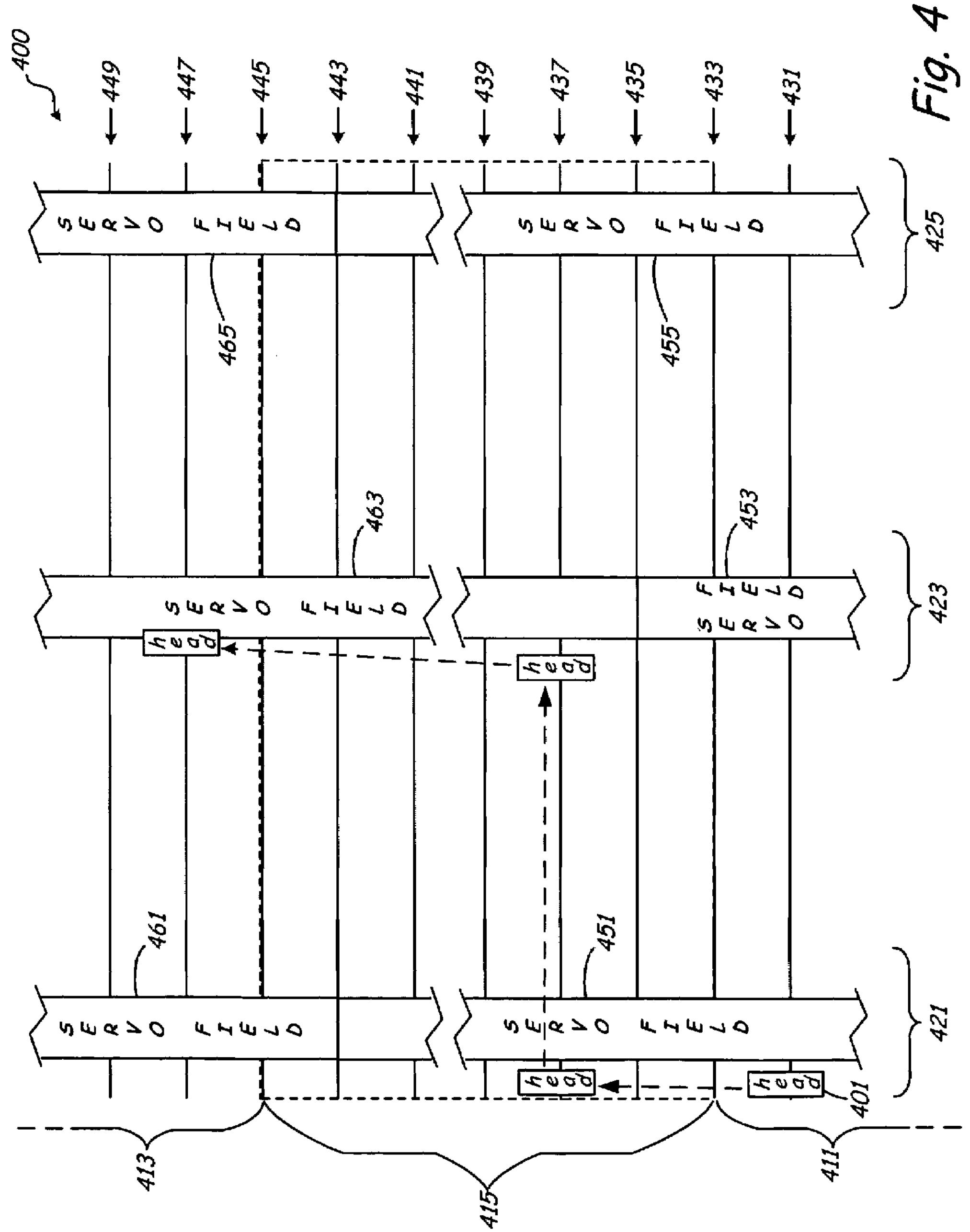
FIG. 4 is a close-up schematic of a section of a data storage medium with optimized servo format, according to another illustrative embodiment.

A more advantageous embodiment that deals effectively with the preceding performance issues is depicted in FIG. 4. This embodiment maintains guaranteed synchronization of the servo channel, predictability of the servo channel performance, and non-interruption of servo tracking and control. FIG. 4 shows a microscopic view of a portion of a media surface 400. The features depicted in FIG. 4 are illustrative of features disposed around the wider media surface 400. Tracks 431, 433, 435, 437, 439, 441, 443, 445, 447, and 449 are portions of concentric tracks that circumscribe media surface 400, and are circle sections seen at close enough range that they resemble straight lines. Zone 411 is inward of zone 413, toward the center of media surface 400, while zone 413 is outward of zone 411, toward the perimeter of media surface 400.

This embodiment also includes guard band 415, which acts as a transition region between zone 411 and zone 413. Guard band 415 is configured to optimize the capability of the read/write head 401 to remain operating at the respective frequency specified for each of zones 411 and 413 while the read/write head 401 is in each zone, and to transition to the respective frequency of a new zone when the read/write head 401 moves to the new zone, whether one of zones 411 and 413, or another zone inward of zone 411 or outward of zone 413, according to different embodiments. This is illustrative of the substantial performance advantages provided by guard band 415.

Tracks on either side of the guard band 415, including tacks 431 and further tracks in zone 411, as well as tracks 447, 449, and further tracks in zone 413, are data tracks available for writing data to and reading data from. Servo sectors 421, 423, and 425 lie across the tracks, with the servo fields within one servo sector bordering at a different track within guard band 415 than the next servo sector. For example, as representatively depicted in FIG. 4, for servo sector 421, servo field 451 of zone 411 and servo field 461 of zone 413 border each other at track 443, close to the border between guard band 415 and zone 413, so that the servo field 451 from zone 411 extends across most of guard band 415 in servo sector 421; for servo sector 423, servo field 453 of zone 411 and servo field 463 of zone 413 border each other at track 435, so that servo field 463 from zone 413 extends across most of guard band 415 in servo sector 423; and for servo sector 425, servo field 455 of zone 411 and servo field 465 of zone 413 border each other at track 443, as in servo sector 421. In this way, a head following one of the tracks between tracks 435 and track 443 encounters servo fields set at the servo frequencies of both zones 411 and 413, alternating with each other, as elaborated below. Guard band 415 thereby includes portions of servo fields from each of the two adjacent zones 411 and 413. This frequency overlap within guard band 415 allows a head to seek there while set to one frequency, and then sync reliably to the new frequency after it is in the guard band.

Tracks 433, 435, 437, 439, 441, 443, and 445 are included in the guard band 415. The number of tracks in a guard band, in different embodiments, may range from just one or two to very many, depending on other characteristics and design priorities of the system and other considerations. For example, it depends on reader and writer offset. As another example, it also depends on seek performance criteria such as undershoot, overshoot, resonance response, re-lock performance of the channel, shock performance, and other factors. This is indicated in FIG. 4 by the break in each of servo sectors 421, 423, 425. It is also undesirable for the head to be operating on tracks too near an adjacent zone, because a shock or external vibration may displace the head into the adjacent zone, which could cause loss of servo synchronization, and an operating delay while the head re-syncs up. In some embodiments similar to that of FIG. 4, from five to ten tracks provide an optimum guard band to avoid these performance issues. In another set of embodiments, it has been found advantageous to include about 80 tracks per guard band, as another example. Other embodiments may have more or fewer tracks than these examples. The guard band is designed so that even if the head is operating in a data track closest to the zone boundary, it will not be driven into the adjacent zone by a shock or external vibration, within specified operating tolerances. Another consideration of the number of tracks in a guard band is the data area loss. If no data were allowed to be written in a guard band, then too many tracks in a guard band would also result in a lesser area to write user data.

Even with the tracks within the guard band being unavailable for writing user data, the gains in efficiency by reducing the circumferential extent of the servo fields provide a substantial overall gain in area available for writing data. If the media surface is divided among too many zones, however, the frequency difference between adjacent zones may become small enough to raise the risk of false Address Mark (AM) identification. A variety of embodiments are possible that vary the number of frequency zones, the density of servo sectors, and the width of the guard bands to optimize for a variety of specifications and tolerances, and for a variety of applications.

While the tracks in the guard bands might not be used to store user data, they can be used to store drive code, drive parameters, and other drive information and applications, including drive data that can be shifted away from the user data tracks. This further mitigates the loss of data capacity involved in area devoted to the guard bands.

Each servo field in zone 411 is disposed along a radial line segment of media surface 400. Although the servo field is "wedge-shaped", due to being bounded by radial lines at an angle to one another, the servo field can still be described as coinciding with a radial line segment passing through the servo field. The radial line segment can define a unique radial line from the center of media surface 400, passing orthogonally through the inner diameter and the outer diameter of media surface 400, that coincides with and overlaps the radial line segment of a particular servo field. The radial line thus defined by each of the servo fields in zone 411 also coincides with or overlaps a corresponding adjacent servo field in zone 413 that lies in the same one of servo sectors 421, 423, 425. The different servo fields within each of servo sectors 421, 423, 425 thereby line up with each other along a common overlapping line, which extends radially through media surface 400 in this illustrative embodiment.

FIG. 4 depicts the motion of head 401 as it seeks from zone 411 to guard band 415. Head 401 is depicted initially seeking from track 431 in zone 411 to track 437 in guard band 415, in an illustrative example of what could be a seek from anywhere in zone 411 to any track in guard band 415, before moving onward to anywhere in zone 413. After head 401 has done a seek to track 437 or a comparable track in guard band 415, head 401 is at first still set to the servo pattern of servo fields 451, 455, and the additional servo fields sharing the servo pattern of zone 411, which alternate within guard band 415 with the servo fields of zone 413, including servo field 463. While on track 437, head 401 attempts to sync to the new servo pattern of zone 413, which is available in servo field 463, for example. As shown in FIG. 4, in servo sector 423, the servo field 463 from zone 413 extends down to track 435. This allows head 401 to sync to the servo pattern of zone 413 in the guard band 415 at servo sector 423 or, if it doesn't achieve a sync to the new servo pattern on its first attempt, then at a similar, subsequent servo field extending into the guard band 415 from zone 413. Many data tracks are available within guard band 415 that intersect the servo fields of both zones 411 and 413, that provide an optimum chance for head 401 to sync to the frequency of the new zone to which it is seeking. Once head 401 has synced to the new servo pattern, it seeks into zone 413, as depicted illustratively in FIG. 4 with a seek, within servo sector 423, from track 437 to track 447 in zone 413.

This process is described here in one particular example that is illustrative of a variety of mechanisms and embodiments. In this particular example, to begin the process of seeking from zone 411 to zone 413, head 401 first seeks from data track 431 to track 437 within guard band 415, in servo sector 421. As head 401 goes from track following mode on track 431, the channel parameters for the new servo burst frequency are loaded, and a new servo search window for the servo burst of zone 413, such as is available in servo field 463, is generated.

A seek operation to cross guard band 415 may be illustrated as follows, according to one illustrative embodiment. A track-following servo controller (not separately depicted) within internal circuitry 239 (as depicted in FIG. 2), controllably moves a suspension 210 to controllably position read/write head 401 in accordance with the position error signal (PES), to maintain the read/write head 401 centered relative to a given servo track within the servo fields, such as track 437 at servo sector 421, for example. The servo controller is then switched to half-rate for its passage through guard band 415, in this illustrative embodiment. The channel searches for the Servo Address Mark of the new frequency of zone 413 with timing to seek to the new zone in servo sector 423. If head 401 can successfully lock to the new frequency, that of zone 413, then the servo feedback signal is maintained from the servo burst with the frequency of zone 413, and the head 401 seeks across guard band 415 to data track 447 in zone 413, as depicted in this embodiment.

If the address mark of the new servo bursts or servo sectors in zone 413 are not found, the old channel parameters for zone 411 are re-loaded, and the servo will search for the servo burst of servo sector 425 with the servo frequency of zone 411 again. Since the track following servo controller is set for half rate, servo sector 425 provides the subsequent PES after servo sector 421. The head 401 then repeats the process of searching for the new Servo Address Mark of zone 413 until it gets successfully synchronized, in these illustrative embodiments.

The embodiment of FIG. 4 is particularly advantageous for a system in which the time required to switch from the frequency of one zone to the frequency of another zone is longer than half of a normal servo sector time, i.e. the length of time from the head 401's passage over one servo sector to the head 401's passage over the subsequent servo sector, e.g. from the passage over servo sector 421 to servo sector 423. In some illustrative embodiments, for example, the medium 400 is incorporated in a data storage system such as disc drive 205 that is a fraction of one inch across, and the servo sector time is in the neighborhood of 100 microseconds. An embodiment such as that illustratively depicted in FIG. 4 may be of particular benefit for such a small disc drive, since it may also have a lower servo burst frequency than a larger disc drive. For example, one illustrative sub one inch disc drive uses a servo burst frequency of 15 MHz (at a rotational speed of 3600 rpm), while a representative larger size 3.5 inch drive uses a servo burst frequency of 60 MHz (at a rotational speed of 5400 rpm). Because the smaller drive has a lower servo frequency, it also has lower format efficiency, and all the more to gain by improving on that efficiency by implementing an optimized servo format such as one of the embodiments disclosed herein.

The strategy of loading Read Channel servo parameters for different sets of servo burst frequencies in the guard band 415, in this illustrative embodiment, is to maintain operational condition for both the sets. This is achieved by saving a copy of critical Read Channel Servo Parameters (Copy X) such as the Frequency Registers, Programmable Filters and Adaptive Filters values upon the exit of a current servo frame/burst (Frequency X) and loading Read Channel Servo Parameters for the next servo frame/burst which is at the new frequency (Frequency Y). Again, upon the exit of the new servo frame/burst with Frequency Y, a copy of the Read Channel Servo Parameters (Copy Y) is saved by the controller. Copy X is then loaded in preparation for entry into the servo frame with Frequency Y. This process is repeated until the servo frame/burst with Frequency Y of the next zone is locked on and the head 401 moves out of guard band 415. The time required to load new parameters for a new servo burst frequency is in the range of 10 microseconds or less, in some illustrative embodiments. This allows plenty of time for the channel to load the parameters for one or another zone's frequency between one servo sector and the next.

Figure 5:
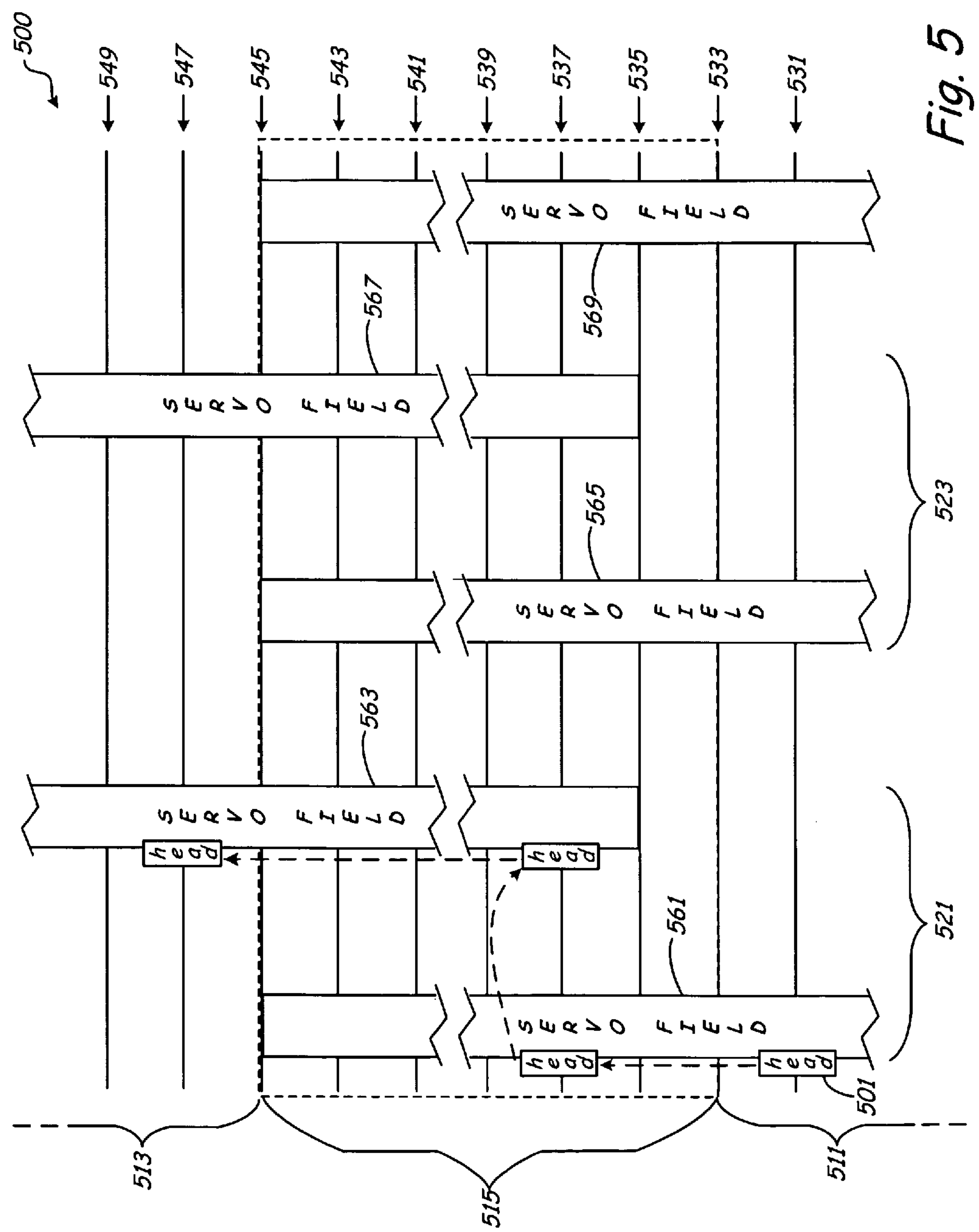
FIG. 5 is a close-up schematic of a section of a data storage medium with optimized servo format, according to another illustrative embodiment.

FIG. 5 depicts another illustrative embodiment that is similar in some ways to media surface 400 of FIG. 4, and is particularly advantageous for a system in which the time required to switch from the frequency of one zone to the frequency of another zone is within half of a normal servo sector period. In writing the servo pattern, if the writing head 501 is able to switch servo burst frequency within a half sector, then one-pass write can be used, as in FIG. 5. Otherwise, the servo bursts in the transition zones can be written in two-pass, as in FIG. 4. In one illustrative embodiment, for example, the medium 500 is incorporated in a data storage system such as disc drive 205 that is a fraction of one inch across with a servo sector time somewhere of 100 microseconds, while the system can switch from the frequency of one zone to the frequency of another zone in around 40 microseconds or less. To take advantage of this, the zone 513 servo burst timing positions are shifted by half of a servo sector from the servo fields of zone 511.

The illustrative embodiment of FIG. 5 is another example that maintains guaranteed synchronization of the servo channel, predictability of the servo channel performance, and non-interruption of servo tracking and control. FIG. 5 shows a microscopic view of a portion of a media surface 500, in which tracks 531, 533, 535, 537, 539, 541, 543, 545, 547, and 549 are portions of concentric tracks that circumscribe media surface 500, and are circle sections seen at close enough range that they resemble straight lines. Zone 511 is inward of zone 513, toward the center of media surface 500, while zone 513 is outward of zone 511, toward the perimeter of media surface 500. This illustrative embodiment also includes guard band 515, which acts as a transition region between zone 511 and zone 513. Tracks 533, 535, 537, 539, 541, 543, and 545 are included in the guard band 515. Tracks on either side of the guard band 515, including tacks 531 and further tracks in zone 511, as well as tracks 547, 549, and further tracks in zone 513, are data tracks available for writing data to and reading data from. The features depicted in FIG. 5 are illustrative of features disposed around the wider media surface 500.

Servo sectors 521 and 523 lie across the tracks, and each includes one servo field from zone 511 and one servo field from zone 513. Servo sector 521 includes servo field 561 from zone 511 and servo field 563 from zone 513, while servo sector 523 includes servo field 565 from zone 511 and servo field 567 from zone 513. (Servo field 569 forms a portion of another servo sector, not individually labeled.) Servo sectors 521 and 523 differ from those in media surface 400 of FIG. 4 in that each of the servo sectors of media surface 500 comprises servo fields that are angularly offset from each other, so that the servo fields within a single servo sector overlap some of the same tracks within guard band 515, for example. In particular, servo fields 561, 565 and 569 are in the inner zone 511, while servo fields 563 and 567 are in the outer zone 513.

Read/write head 501 is depicted in FIG. 5 to have an initial position in zone 511 (as an example, on track 531), at servo field 561 in servo sector 521, and is preparing to seek to zone 513, as an illustrative example of operation with media surface 500. Head 501 first seeks to guard band 515; specifically, for example, to track 537, also on servo field 561, which extends across guard band 515. Once head 501 has entered guard band 515, the channel parameters for the new servo burst frequency are loaded and a new servo search window for the servo burst of servo field 563 are generated. The channel will search for the Servo Address Mark in servo field 563 of the new frequency of zone 513 at a half sector time away from servo field 561. If the channel can successfully lock to the address mark at the new frequency of zone 513, then the servo feedback signal switches to the servo burst with the new frequency of zone 513. Otherwise, the old channel parameters for zone 511 are reloaded, and the channel will search for the servo burst with the servo frequency of zone 511 again. Then, the head 501 will repeat the process of searching for the new Servo Address Mark of zone 513 until it successfully gets synchronized.

Figure 6:
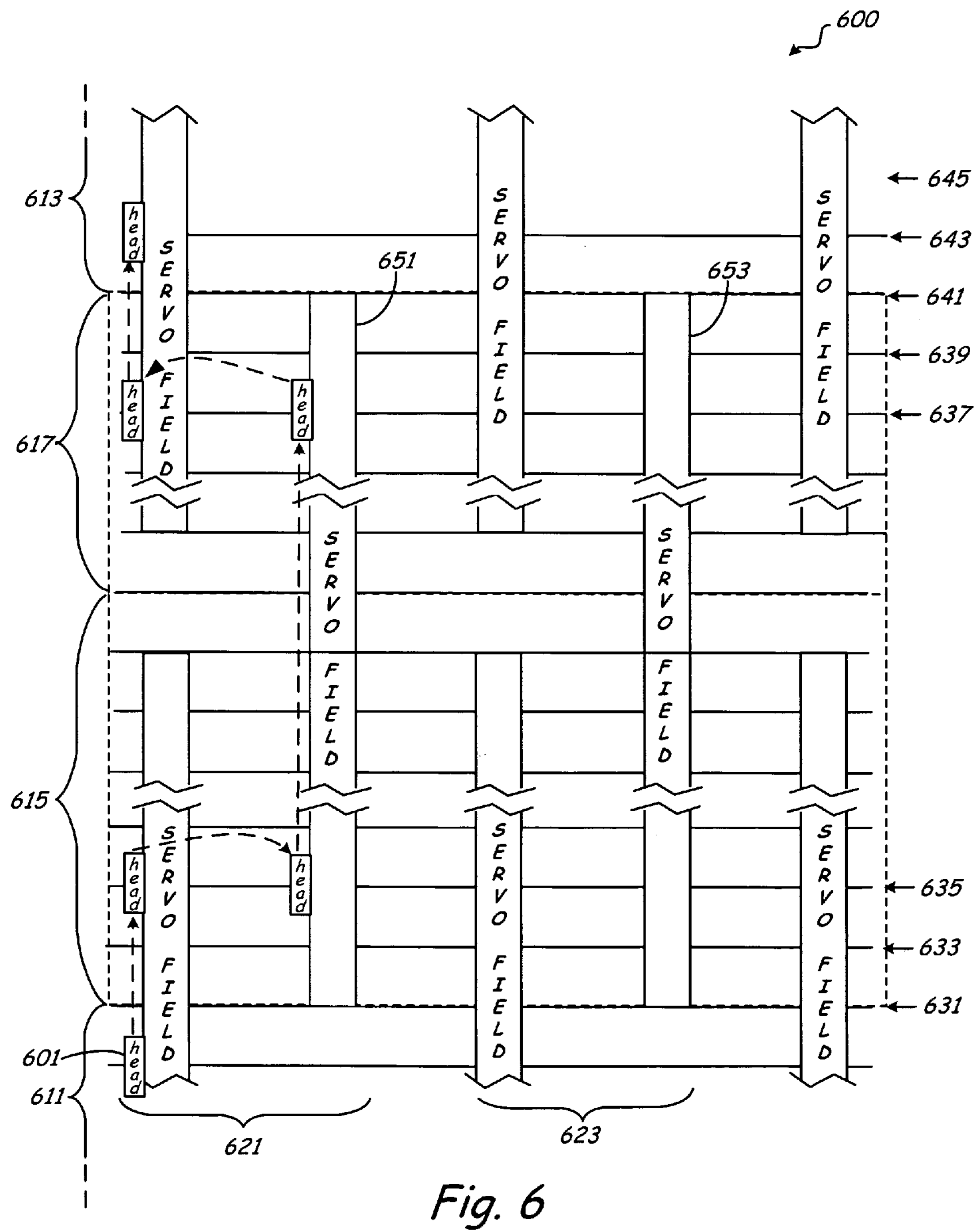
FIG. 6 is a close-up schematic of a section of a data storage medium with optimized servo format, according to another illustrative embodiment.

FIG. 6 depicts another illustrative embodiment, this one including transitional servo field segments 651, 653 within an adjacent pair of guard bands 615, 617. Guard bands 615, 617 may contain any of a wide number of tracks, as indicated by the breaks depicted in the servo fields in both guard bands 615, 617. This embodiment also has servo fields in adjacent zones lined up in the same radial servo sectors, doing without a servo sector period shift from zone to zone as in the embodiment of FIG. 5. Media surface 600 includes two guard bands 615, 617, disposed side by side between inward zone 611 and outward zone 613. In guard band 615, servo frequency switching is accomplished as described above. In guard band 617, head 601 re-locks to the servo bursts of zone 613 on a servo field coinciding along a radial line with the servo field it started seeking through the guard bands from, in servo sector 621. Media surface 600 therefore includes some transitional servo field segments 651, 653 that are offset from the radial lines coincident to the servo fields in both the inner zone 611 and in the outer zone 613. Transitional servo field segments 651, 653 are angularly separated from the servo fields in the first zone 611 and from the servo fields in the second zone 613.

Figure 7:
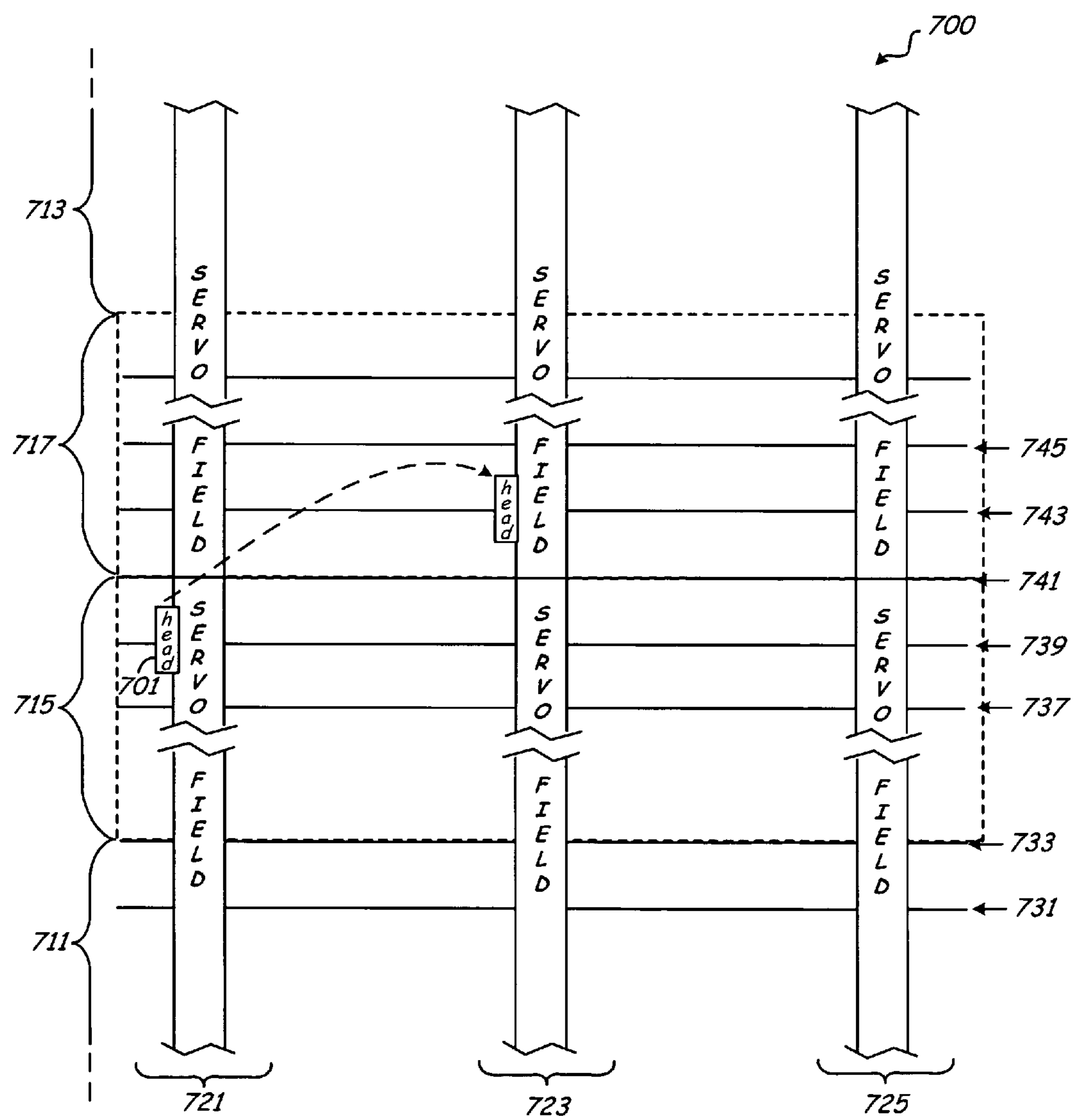
FIG. 7 is a close-up schematic of a section of a data storage medium with optimized servo format, according to another illustrative embodiment.

FIG. 7 depicts another illustrative embodiment, this one also with two guard bands 715, 717 between adjacent zones 711, 713, and also without a servo sector timing shift. This illustrative embodiment also lacks an overlap in servo fields on any data tracks. Media surface 700 includes two guard bands 715, 717, disposed side by side between inward zone 711 and outward zone 713. In guard band 715, when the predicted position of head 701 in the subsequent servo sector (such as sector 723) is in second guard band 717, servo frequency switching is accomplished as described above. Head 701 then seeks from servo sector 721 in guard band 715 to servo sector 723 in guard band 717. If head 701 is able to sync successfully with the frequency of outward zone 713, it passes out of second guard zone 717 into outward zone 713; otherwise it repeats the attempt to sync in the next servo sector. Guard bands 715 and 717 provide further assurance of the reliable performance of head 701 in each of representative zones 711 and 713.

In any of the above or further embodiments, the depicted elements are representative of any number of zones, guard bands, servo sectors, and other elements that can be selected in different embodiments. For example, a media surface may have zones determined by dividing equal portions of the radius of the media surface; in other embodiments, it is more efficient to use uneven spacing for the boundaries between zones, such as by increasing the radial width of the outer and/or outward zones, which have tracks of greater arc length, and a lowered radial width of the inner and/or inward zones. Tracks closer to the outer diameter are capable of holding more data, so if servo zones closer to the outer diameter have more tracks, it can further improve the format efficiency.

As another example, the fast sync-up time is a significant factor in determining optimum relative zone sizes. In some disc drives of one inch or less in diameter, for example, the ramp load/unload technique may be used. The load/unload ramp may be located on either the inner diameter or the outer diameter of a media surface, in various embodiments. When the initial sync-up is done in the inner zone, the head can be tuned to the inner zone servo burst frequency. During the Address Mark (AM) locking period, the head can shuttle in the inner zone under a back electromotive force (BEMF) speed/position control feedback signal. Since the inner zone crash stop location can be easily determined, the stroke of the shuttle action can be easily confined to the inner zone. In case of a retry from a missing AM, the head can switch to the servo burst frequency of the inner zone and move back to the inner zone to re-sync up.

Initial loading in the outer zone is also based on a BEMF feedback signal, in some embodiments. Experimentation on some illustrative embodiments with a ramp at the outer diameter, in various operating conditions, has shown that the first sync up location is often in the middle of the outer zone of the media surface, adjacent the outer diameter. This first sync-up can use feedback from a gray code in the servo fields, for example. After sync-up and good gray code is available from time to time, the feedback signal for head velocity control can be switched from BEMF to gray code. As the velocity loop in sync-up process has a relatively low bandwidth, the good gray code feedback signal can be much less frequent than PES in track following control.

To achieve a fast sync-up, an embodiment having a relatively larger outer zone may be advantageous in providing certainty that the initial sync-up will take place there, rather than allowing a significant risk of the read/write head moving to the next inward zone prematurely and losing sync. Preventing the head from moving prematurely past the outer zone is also easier with the head velocity relatively low, for example, less than one inch per second, in one illustrative embodiment. After the first sync-up in the outer zone, the velocity reference may be reduced to zero, in this embodiment, to further prevent the head from crossing the zone boundary prematurely. With the head position estimated with reference to the BEMF feedback signal, if the estimated head position is too close to the zone boundary, the velocity reference may be changed to the opposite direction. Another method of assuring sync-up is to toggle between the servo frequencies of the outer zone and the next inward zone until the head successfully locks up to the servo bursts of its position.

The seeking operations within a given servo zone are similar to those in conventional data storage systems, in some illustrative embodiments. When seeking across servo zones, the frequency in the servo fields change. The servo channel needs to change accordingly to sync to the new frequency. A track position prediction of the next servo sector, and evaluating whether it belongs to another zone, are important for preparing the channel for the new zone. For state feedback control, the track prediction can be done directly from the position variable in the state estimator.

Generally, with X as the head position, V as the head velocity, and A as the head acceleration, the track prediction can be derived by $$X(k+1)=X(k)+V(k)+0.5*A(k)$$

$$V(k)=V(k-1)+A(k-1)$$

$$X(k)=X(k-1)+V(k-1)+0.5*A(k-1)$$

These can be used to derive the following relations:

$$V(k-1)=X(k)-X(k-1)-0.5*A(k-1)$$

$$V(k)=X(k)-X(k-1)+0.5*A(k-1)$$

$$X(k+1)=X(k)+X(k)-X(k-1)+0.5*A(k-1)+0.5A(k)$$

The track prediction by the last of these relations is accurate enough for prediction of the zone of the next servo sector. If a more accurate prediction is desired, a relation can be used which further includes corrections for code delay. This is illustrative of one possible example among many servo algorithms that may be used to perform track prediction.

If the estimated track of the next servo sector will be in the next frequency zone, the channel loads the parameters for the next frequency zone at the boundary track. With a parallel interface channel, the time for switching between two sets of parameters for two adjacent zones is within 20 microseconds, in one illustrative embodiment. The servo synthesizer settling time can be controlled to less than 30 microseconds, in this embodiment. For a sub-one-inch disc drive with limited servo sampling frequency, there is enough time for frequency switching before a subsequent servo frame with a different frequency. In an embodiment in which the servo channel has pre-stored banks of servo channel data, the switch to the new frequency is even faster.

Servo fields may be written in different ways, including in-situ and ex-situ. For in-situ written systems with more than one head (such as STW, self-servo), the current head and the head to be switched to will be on the same track and the same zone from one media surface to another. Head switching then correlates for each of the heads across the media surfaces. However, head switching is a little more complicated in embodiments that have had the servo fields written ex-situ.

For ex-situ written systems, there may be a variation or skew in the alignment, between the different heads and corresponding media surfaces within the system. For example, this skew was found to be as much as 800 tracks in one illustrative embodiment in which each media surface had a track density of 100,000 tracks per inch. Because of this skew, one head may be in one zone while other heads are in adjacent zones on their corresponding media surfaces. The position of a head to be switched to, i.e. a target head, is needed for setting the proper zone parameters for the servo channel during the head switch. The head alignment offset between heads follows a curve having a sine waveform with some DC component. The head alignment offset between the heads in one embodiment has been calibrated in a certification test to evaluate the head alignment offset, including DC offset, AC peak, and AC peak location, for each zone boundary, including the outer diameter, the intermediate diameter zone boundaries, and the inner diameter. With the calibration data and the prediction of the current head position at the next servo sector, the target head position at the next sector can also be computed. The computed position of the target head is used to avoid switching the head position to an unusable track between zones and the resulting missed sync-up. The computed position of the target head at the next servo sector is evaluated prior to a head switch. If it is outside of an unsafe head switch position, the decision to switch to the target head can be made. Whether the target head position is in a new frequency zone is also evaluated, and a frequency switch is also performed if needed. The algorithm used therefore insures that the heads will be kept in safe tracks where they will remain in sync, despite any head skew. This demonstrates one illustrative embodiment of a means for controllably positioning the read/write head from a first one of the zones to a second of the zones, and a means for changing the operating frequency of the read/write head from the respective frequency of the first one of the zones to the respective frequency of the second one of the zones, included within an illustrative embodiment of a data storage system.

If the head does lose sync, there are a number of techniques that may help it regain sync with the servo tracks, any or all of which may be applicable to a given embodiment. Re-sync can be done in a zone with zero bias force position. When servo sync is lost, the head can be switched to zero velocity control based on BEMF and then left to drift to a zero force bias position. Then the channel parameters for that zone are set, and re-lock is attempted. If this fails, the head can be unloaded to restart sync-up with the head being re-loaded.

As another technique, when sync is being lost, the servo switches to BEMF control. Based on the last track number, velocity, and acceleration information before losing sync, and integration of the BEMF, the head can be approximately controlled into a selected zone. The head shuffles in this zone and tries to re-lock. If this attempt times out, the head is unloaded and sync-up is restarted from head loading. Whatever re-sync technique is used, the demodulation sync process should ensure a sufficient track clearance from a zone boundary before turning control over to a recovery seek process, to make sure the actuator builds up enough velocity for crossing the zone boundary.

The present invention therefore includes unexpected and novel advantages as detailed herein and as can be further appreciated from the claims, figures, and description by those skilled in the art. Although some of the embodiments are described in reference to a data storage medium or a data storage system, or to even more particular embodiments such as a disc or a disc drive, the present invention has various other embodiments with application to other data storage technologies.

It is to be understood that even though numerous characteristics and advantages of various illustrative embodiments of the invention have been set forth in the foregoing description, together with details of the structure and function of various embodiments of the invention, this disclosure is illustrative only, and changes may be made in detail, especially in matters of structure and arrangement of parts within the principles of the present invention, to the full extent indicated by the broad, general meaning of the terms in which the appended claims are expressed. It will be appreciated by those skilled in the art that the teachings of the present invention can be applied to a family of systems, devices, and means encompassed by and equivalent to the examples of embodiments described, without departing from the scope and spirit of the present invention. Further, still other applications for various embodiments, including embodiments pertaining to data storage media and data storage systems, are comprised within the present invention.

What is claimed is:

1. An apparatus comprising:

a first zone of storage tracks having servo information written with a first frequency;

a second zone of storage tracks having servo information written with a second frequency; and a guard band of storage tracks disposed between the first zone and the second zone, a storage track in the guard band having some servo information written with the first frequency and other servo information written with the second frequency.

2. The apparatus of claim 1 wherein the servo information written with the first frequency is radially aligned with the servo information written with the second frequency.

3. The apparatus of claim 1 wherein the guard band comprises transitional servo information that is separated from the servo information written with the first frequency and the servo information written with the second frequency.

4. The apparatus of claim 1 wherein the servo information written with the first frequency and the servo information written with the second frequency are radially offset from each other.

5. The apparatus of claim 1, wherein the guard band comprises system information for a data storage system configured to read the apparatus.

6. The apparatus of claim 5, wherein the system information includes system code or system parameters.

7. The apparatus of claim 1 wherein the servo information of the storage track in the guard band defines a pattern of alternating frequencies in adjacent servo sectors.

8. The apparatus of claim 1 wherein the servo information of a plurality of storage tracks in the guard band defines a pattern of alternating frequencies in adjacent servo sectors.

9. The apparatus of claim 1 wherein a first servo sector has servo information written with the first frequency in more storage tracks in the guard band than tracks written with the second frequency, and wherein a second servo sector adjacent the first servo sector has servo information written with the second frequency in more storage tracks in the guard band than tracks written with the first frequency.

10. The apparatus of claim 1 comprising transitional servo information that is separated from the servo information written with the first frequency and the servo information written with the second frequency and exists only in the guard band.

11. The apparatus of claim 10 wherein the servo information written with the first frequency exists in the guard band of storage tracks but not in a second guard band of storage tracks adjacent the guard band of storage tracks.

12. A system comprising:

a deck;

a media surface disposed on the deck; and a read/write head suspended from the deck such that the read/write head is controllably positionable proximate to the media surface;

wherein the media surface comprises:

radial servo fields;

two or more annular zones of storage tracks, each zone having a frequency with which the servo fields are written in that zone, that is different from a frequency of another zone; and a guard band of storage tracks between the zones, a storage track in the guard band having servo fields written with different frequencies.

13. The system of claim 12, wherein the guard band comprises system code, system parameters, or other system information for the system.

14. The system of claim 12, wherein the guard band comprises transition servo field segments that are separated from the servo fields.

15. The apparatus of claim 12 wherein the servo fields of one of the storage tracks in the guard band define a pattern of alternating frequencies in adjacent servo sectors.

16. The apparatus of claim 12 wherein the servo fields of a plurality of storage tracks in the guard band define a pattern of alternating frequencies in adjacent servo sectors.

17. The apparatus of claim 12 wherein a first servo sector has servo fields written with the first frequency in more storage tracks in the guard band than tracks written with the second frequency, and wherein a second servo sector adjacent the first servo sector has servo fields written with the second frequency in more storage tracks in the guard band than tracks written with the first frequency.

18. The apparatus of claim 12 comprising transitional servo fields that are separated from the servo fields written with the first frequency and the servo fields written with the second frequency and exist only in the guard band.

19. The apparatus of claim 18 wherein the servo fields written with the first frequency exist in the guard band of storage tracks but not in a second guard band of storage tracks adjacent the guard band of storage tracks.

20. A system, comprising:

a read-write head;

an apparatus comprising servo information having two or more frequencies; and a means for the read/write head to sync to the servo information at each of the frequencies on the apparatus.

* * * * *